United States Patent
Blanco et al.

(10) Patent No.: US 9,071,986 B2
(45) Date of Patent: Jun. 30, 2015

(54) METHOD AND APPARATUS FOR DYNAMICALLY CONTROLLING QUALITY OF SERVICE

(71) Applicant: MOTOROLA SOLUTIONS, INC., Schaumburg, IL (US)

(72) Inventors: Alejandro G. Blanco, Ft. Lauderdale, FL (US); Michael F. Korus, Eden Prairie, MN (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 226 days.

(21) Appl. No.: 13/856,711

(22) Filed: Apr. 4, 2013

(65) Prior Publication Data

US 2014/0301196 A1  Oct. 9, 2014

(51) Int. Cl.

| | | |
|---|---|---|
| *H04L 1/00* | (2006.01) | |
| *H04W 28/02* | (2009.01) | |
| *H04M 3/22* | (2006.01) | |
| *H04L 29/08* | (2006.01) | |
| *H04W 4/00* | (2009.01) | |
| *H04M 7/12* | (2006.01) | |

(52) U.S. Cl.
CPC ........ *H04W 28/0268* (2013.01); *H04M 3/2227* (2013.01); *H04M 7/1275* (2013.01); *H04M 2203/2094* (2013.01); *H04M 2207/182* (2013.01); *H04L 67/22* (2013.01); *H04L 67/322* (2013.01); *H04W 4/00* (2013.01)

(58) Field of Classification Search
CPC ..... H04L 47/14; H04L 12/5695; H04L 47/10; H04L 47/18
See application file for complete search history.

(56) References Cited

U.S. PATENT DOCUMENTS

| | | | |
|---|---|---|---|
| 2005/0128963 A1* | 6/2005 | Gazda et al. .................. 370/278 |
| 2007/0299796 A1 | 12/2007 | MacBeth | |
| 2008/0274729 A1* | 11/2008 | Kim et al. ..................... 455/423 |
| 2009/0197585 A1 | 8/2009 | Aaron | |
| 2009/0201886 A1* | 8/2009 | Lee et al. ...................... 370/335 |
| 2009/0312029 A1 | 12/2009 | Ananthanarayanan | |
| 2011/0314145 A1 | 12/2011 | Raleigh | |
| 2012/0117636 A1 | 5/2012 | Adams | |

FOREIGN PATENT DOCUMENTS

| | | |
|---|---|---|
| GB | 2361329 A | 10/2001 |
| WO | 2010039565 A3 | 7/2010 |
| WO | 2012018501 A1 | 2/2012 |

OTHER PUBLICATIONS

PCT International Search report dated Jul. 28, 2014, counterpart to PCT/US2014/031743.

* cited by examiner

*Primary Examiner* — Andrew Lai
*Assistant Examiner* — Jamaal Henson
(74) *Attorney, Agent, or Firm* — Kenneth A. Haas

(57) ABSTRACT

A method and apparatus for dynamically controlling quality of service (QoS) is provided herein. During operation, a QoS manager will determine if a device is currently being used by an individual. The QoS of the device will then be tailored based on whether or not the device is currently being used by the individual. Devices that may be running applications, yet unused by anyone may have their QoS reduced. This will allow the QoS to be increased for devices that are currently being used.

14 Claims, 8 Drawing Sheets

METHOD AND APPARATUS FOR DYNAMICALLY CONTROLLING QUALITY OF SERVICE

FIELD OF THE INVENTION

The present invention generally relates to quality of service, and more particularly to a method and apparatus for dynamically controlling quality of service.

BACKGROUND OF THE INVENTION

Many users, especially in markets such as public safety, will use multiple devices, running multiple applications, throughout their day. These devices include things such as laptop devices, handheld computers, tablets, cellular telephones, public-safety radios, . . . , etc. Even when a device is not currently being used by an individual, application(s) may continue to run on the device, utilizing valuable bandwidth.

The amount of bandwidth being used by any network could increase dramatically in scenarios where a large number of co-located users exist. For example, consider a situation where a large amount of police officers arrive on a scene, with each police officer carrying multiple devices. Any network servicing the scene may be quickly overwhelmed by the amount of data being transmitted.

What makes the above situation even worse is the fact that as police officers leave their vehicles, any devices left within their vehicles may be using valuable bandwidth, even though the devices are not being by any police officer. Those devices that are brought into the field with the officers may suffer degraded service as a result of the bandwidth consumed by the applications running on unused devices.

As is evident, having devices/applications utilize precious bandwidth when the officers are not using the devices can be a major problem. Therefore, a need exists for a method and apparatus for dynamically controlling quality of service (QoS) of devices/applications based on their immediate need, even though these devices may be actively running applications that desire a high QoS.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
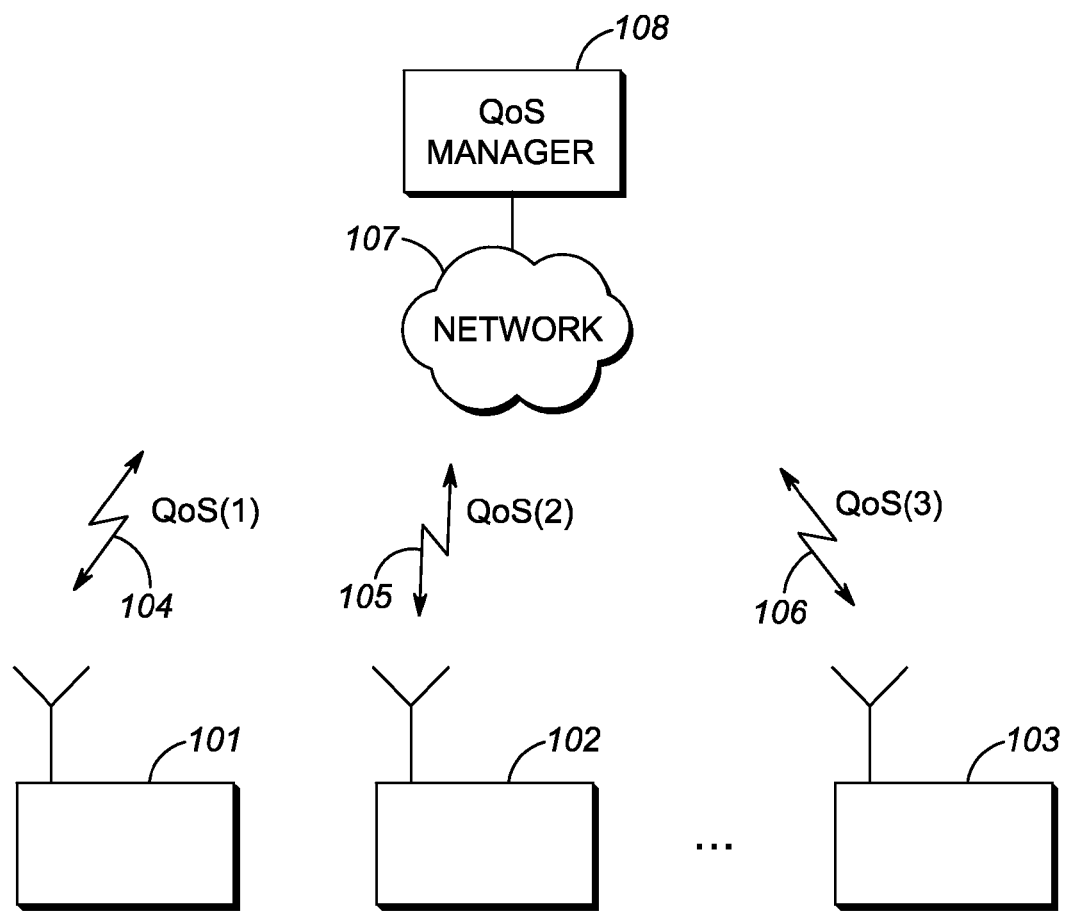
FIG. 1 is block diagram illustrating a general operational environment, according to one embodiment of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need a method and apparatus for dynamically controlling quality of service (QoS) is provided herein. During operation, a QoS manager will determine if a device is currently being used by an individual. The QoS of the device will then be tailored based on whether or not the device is currently being used by the individual. Devices that may be running applications, yet unused by anyone may have their QoS reduced. This will allow the QoS to be increased for devices that are currently being used.

It should be noted that in many instances the text may refer to adjusting a QoS for a "device". In actuality, such an adjustment for a "device" typically occurs by adjusting a QoS for individual application(s) running on the device. Thus, the QoS adjustment of a "device" may occur by either adjusting the QoS of the device as a whole or simply adjusting the QoS for any application(s) running on the device. The phrases "adjusting the QoS of a device" and "adjusting the QoS of an application running on a device" may be used interchangeably. Therefore the use of the phrase "adjusting a QoS for a device", is envisioned to encompass either adjusting the QoS for individual application(s) running on the device, or simply adjusting the QoS of the device as a whole.

Additionally, it should be noted that a device "being used" specifically involves an active utilization of the device by a user that includes direct interaction/contact between the user and the device, irrespective as to whether or not applications are running on the device. In other words, simply because an application may be running on a user's device, does not necessarily mean that the device is "being used" by a user. For example, assume an in-car receiver is being used by a police officer to view a video feed from within a building. The officer may be considered to be actively using the device since the officer is in the process of watching a video feed on the device. Thus, when watching the device, the device is "being used" by the police officer. However, if the officer leaves his automobile, the application may continue to run on the device, and video may be continuously shown by the device even though the officer is not currently viewing the device. Simply because the video is being shown by the device does not entail active use of the device. As is evident, when the officer steps away from the device, the officer is no longer actively using the device, even though applications may be running on the device. Thus, the QoS of the device may be decreased without adversely affecting the officer.

In addition to a device "being used", a finer grain QoS is possible if based on application "usage". For example, it may be the case that a single device is "being used" and has 3 active applications being run simultaneously, all applications are consuming QoS bandwidth. If a particular application's window is minimized or has detected lack of user input, the application may be considered "unused". The QoS for this application can be decreased, allowing the other co-resident applications on the device to have relatively higher QoS. In this situation the QoS gains may impact more than just the one device. For example, suppose the user is watching a high QoS video consuming 250 Kbps of high QoS guaranteed bandwidth (GBW). Now the user minimizes the video window and the QoS is lowered (e.g. from GWB to non-GBW). This lowering of QoS frees up resources in the network that can now be allocated to any higher QoS flow(s) on any device being serviced by the network. So the "newly" available resources resulting from minimization of the video application on a first device can be allocated to one or more devices.

Finally, it should be noted that Quality of Service (QoS) comprises requirements on all aspects of a connection, such as service response time, tolerable error rate, signal-to-noise ratio, cross-talk, echo, interrupts, frequency response, loudness levels, data rates, bandwidth utilized, and so on. For example, a device may be utilizing a higher bandwidth when actively being used than when not actively being used. Because the QoS for devices not being actively used are lowered, the QoS for devices actively being used may increase dramatically.

There are a number of techniques to determine whether a device is being actively used by someone. These techniques include, but are not limited to:

Determining if devices are co-located with a user—It could be assumed that if a user is in the proximity of a device, the device is actively being used by the user. For example, GPS or Bluetooth receivers may be utilized to determine a device's location along with a user's location. When the determined locations are outside a predetermined distance from each other, the device could be considered not actively being used. Additionally, facial detection may be utilized to determine if a user is actively using a device. If no face is detected by a device, the user may be considered to not be actively using the device.

Determining if a device is inactive—It could be assumed that if a device (or application) is inactive, the device/application is not actively being used by the user. For example, if a screen lock is present on a device, or if there is a lack of input on the device/application over a predetermined period of time, the device may be considered not actively being used.

Determining if motion is detected—It could be assumed that if motion is detected for a handheld or body-worn device, the device is actively being used by the user.

There may be many techniques to determine if a user is actively using a device or an application on a device. Regardless of which technique is utilized, the QoS of the device will be adjusted based on whether or not the device is actively being used. Thus, during active use, the device may be running an application at a first QoS. When the user is no longer actively using the device or application, the same application may continue to run, uninterrupted, however, the QoS may be lowered. Thus, the device/application may run utilizing a first bandwidth when the application is being used. The application may run using a second bandwidth, lower than the first bandwidth when the application is unused.

Turning now to the drawings wherein like numerals designate like components, FIG. 1 is block diagram illustrating a general operational environment, according to one embodiment of the present invention. As shown, QoS manager 108 is provided in communication with devices 101-103 through network 107. Devices 101-103 may comprise any electronic device such as, but not limited to police radios, laptop computers, tablet computers, cellular telephones, PDAs, . . . , etc. Devices 101-103 may all be associated with a single user, or alternatively may be associated with different users. For example, devices 101-103 may be a single user's cellular telephone, police radio, tablet, . . . , etc. Alternatively, devices 101-103 may be devices (e.g., police radios) utilized by different users. As discussed above, multiple applications may be run simultaneously on any particular device 101-103.

It should be noted that although QoS manager 108 is shown as a separate network entity, QoS manager 108 may exist in any element/device utilizing network 107. For example, QoS manager 108 may exist in a single device 101-103, may be replicated and exist in each device 101-103, or may exist in any network entity such as access points (not shown), base station controllers (not shown), enterprise network controllers, application controllers, . . . , etc. When QoS manager 108 resides outside of devices 101-103, QoS manager 108 is referred to as being a network QoS manager 108.

Network 107 may comprise any wide-area network, local-area network, personal-area network, or any combination of networks capable of facilitating communication between devices and QoS manager 108. Network 107 may utilize any combination of system protocols such as, but not limited to an IEEE 802.11 system protocol, Bluetooth, HyperLAN, 3GPP, 3GPP2, APCO 25, or any other communication system protocol.

During operation, devices 101-103 will utilize communication signals 104-106 to actively transmit uplink and receive downlink information to QoS manager 108 and other network entities. QoS manager 108 will communicate QoS changes to network 107 of uplink and downlink signals 104-106 based on whether or not devices or applications 101-103 are actively being used by a user.

Additionally, a device-resident QoS manager 108 can make these decisions. Example: a device decides what a new QoS should be for an application. The device has two options (depending on the network): Option 1: The device informs the infrastructure QoS manager 108 of the new QoS which then informs network 107 requesting the QoS change. Option 2: The device directly requests network 107 to make the QoS change. For example, devices 101-103 may all have users that are actively using devices 101-103.

With the above in mind, uplink/downlink transmissions 104 may be utilizing a first QoS value (QoS(1)), uplink/downlink transmissions 105 may be utilizing a second QoS value (QoS(2)), and uplink/downlink transmissions 106 may be utilizing a third QoS value (QoS(3)). If device 101 is determined by QoS manager 108 to no longer be actively used by a user, QoS(1) may be decreased accordingly with QoS(s) and QoS(3) being increased. This may be accomplished by QoS manager 108 instructing the appropriate network entity of the QoS modification. For example, if QoS manager 108 is in communication with an access point serving devices 101-103, the access point may be instructed to adjust the QoS accordingly. In a similar manner, if QoS manager 108 is in communication with a wide-area network's core (e.g. 3GPP PCRF and/or 3GPP PDN-GW) the network's core may be instructed accordingly.

Figure 2:
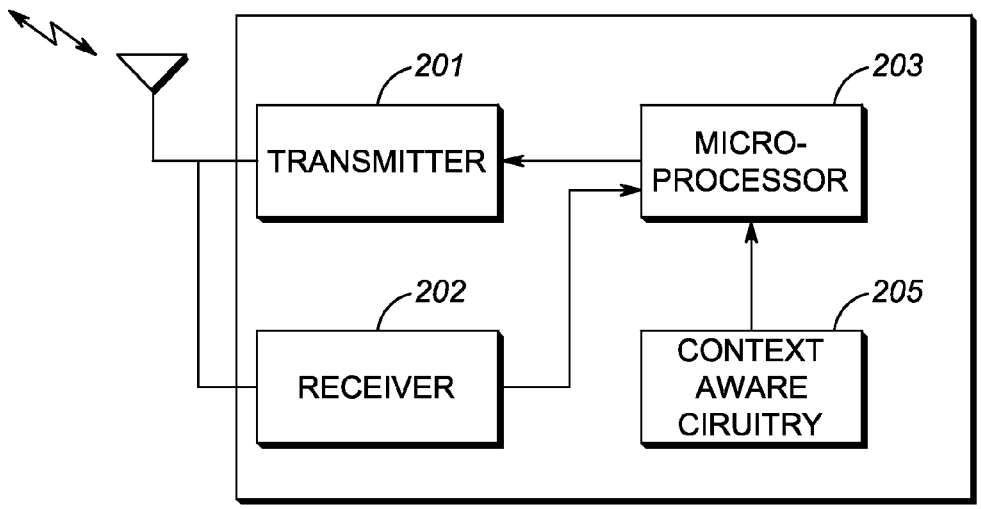
FIG. 2 is a block diagram of a remote device of FIG. 1.

FIG. 2 is a block diagram of a remote device of FIG. 1. Microprocessor 203 comprises a digital signal processor (DSP), general purpose microprocessor, a programmable logic device, or application specific integrated circuit (ASIC) and may be utilized as a device QoS manager 108 to determine an appropriate QoS for a device, or simply to provide a current context to a network QoS manager 108 so that the network QoS manager may determine the appropriate QoS. Microprocessor 203 may also detect whether an application has been minimized, placed behind another window, been idle, etc.

Context-aware circuitry 205 may comprise any circuitry capable of generating a current context. For example, context-aware circuitry 105 may comprise a GPS or Bluetooth receiver capable of determining a location of the user device, may comprise a camera capable of facial detection, or may comprise a motion detector. Alternatively, circuitry 205 may comprise such things as a clock, calendar, environmental sensors (e.g. a thermometer capable of determining an ambient temperature, humidity, presence of dispersed chemicals, etc.), an accelerometer, a barometer, speech recognition circuitry, a user's electronic calendar, short-range communication circuitry (e.g., Bluetooth™ circuitry) to determine what other electronic devices are near . . . , etc.

Finally, receiver 202 and transmitter 201 are common circuitry known in the art for communication utilizing a well known communication protocol, and serve as means for transmitting and receiving messages to QoS manager 108 as well as communication among the various devices 101-103. Such transmitters and receivers include, but are not limited to transmitters and receivers utilizing 3GPP, 3GPP2, Bluetooth, IEEE 802.11, APCO, or HyperLAN protocols.

During operation of microprocessor 203 may determine if the device is being used by user. This determination may take place using many differing techniques. For example, microprocessor 203 will make this determination by accessing context-aware circuitry 205 to determine if a particular trigger has been received. For example, context-aware circuitry may detect whether or not a face has been detected, whether or not motion has been detected, . . . , etc. Additionally, microprocessor 203 may determine whether or not a screen is active, whether or not a particular application is minimized, whether or not a particular application is behind a window of another application, . . . , etc.

The information on whether or not the device is being actively used, along with device ID may be passed to a network QoS manager. If QoS is being tailored on an application by application basis for a single device, then the use of a particular application may be determined by microprocessor 203 determining whether an application has been minimized, placed behind another window, been idle, etc. A positive indication of either of these will indicate that a particular application is unused.

Regardless of how active use is determined, QoS manager will adjust the QoS of transmitter 201 and receiver 202 based on whether or not the device or specific application(s) is actively being used. When microprocessor 203 is acting as a QoS manager, microprocessor 203 may instruct transmitter 201 and receiver 202 accordingly. However, when a network QoS manager (i.e., a QoS manager separate from an individual device) is being used, the network QoS manager may instruct all network entities about the QoS change.

Figure 3:
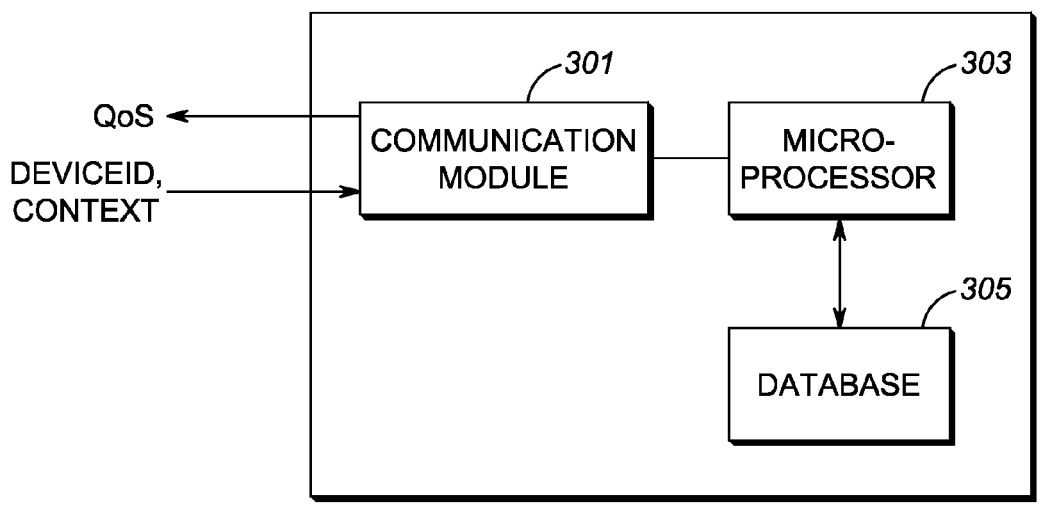
FIG. 3 is a block diagram of a QoS manager of FIG. 1.

FIG. 3 is a block diagram of a networked QoS manager of FIG. 1. As shown, QoS manager 108 comprises microprocessor 303 that may be a digital signal processor (DSP), general purpose microprocessor, a programmable logic device, or application specific integrated circuit (ASIC) and is utilized to determine an appropriate QoS for device 101-103. The communication module 301 facilitates communication with other devices and also includes various software components for handling data received by RF circuitry (not shown) and/or an external port (not shown). Such communication my comprise simple RF transmissions based on any of the above-described system protocols, or wired communications (e.g., Universal Serial Bus (USB), FIREWIRE, etc.). Regardless of the form communication module 301 takes, module 301 is designed to receive a device ID and a current context. Microprocessor 303 may use the current device ID and context to access database 305 to determine an appropriate QoS for a particular device based on its ID and context.

For example, database 305 may comprise minimum and maximum QoS values for any device. If it is determined that a particular device is currently being used, the device may be allowed to operate at the maximum QoS. The alternative may be true. If microprocessor 303 determines that a device is inactive, the device may be instructed to operate at a minimum QoS. As mentioned above, the device "being instructed to operate at a minimum QoS" may comprise a particular application(s) on the device to operate at a minimum QoS.

For application-specific QoS reduction (i.e., reducing the QoS on an application-by-application basis on a single device as opposed to lowering the QoS for the device as a whole), the QoS is lowered for a particular unused application (even though the application may be running) relative to the application's current QoS. So if 3 applications were running on a device with QoS 1, 2, 3, and the device is declared "not being used" the devices relative QoS is reduced (so now the apps are running with QoS 3, 4, 5). Alternatively, if 3 applications were running on a device with QoS 1, 2, 3, and the first two applications were sensed as being "unused", then the QoS may be reduced for the first two applications so that they are running with a QoS of, for example, 4, 5, 3. (wherein 1 is the highest QoS with increasing values representing a decrease in QoS, where QoS may be in terms of reserved/guaranteed resources (e.g. Guaranteed Bit Rate resources) or non-guaranteed resources (Non-Guaranteed Bit Rate resources, or a combination)

It should be noted that instructions on the appropriate QoS may take place to any network entity in order to facilitate the appropriate QoS. For example, not only may a particular device be instructed on its own QoS, but, for example, a base station may be instructed to transmit to the device utilizing a particular QoS. This QoS value will be output to the appropriate network entities by communication module 301. So, for example, if 3 applications were running on a device with QoS 1, 2, 3, and the device is declared "not being used" the devices relative QoS is reduced (so now the apps are running with QoS 3, 4, 5). In addition, infrastructure equipment (e.g., a bases station, base station controller, . . . , etc.) may be notified to reduce the QoS of any downlink communications to the device accordingly.

Figure 4:
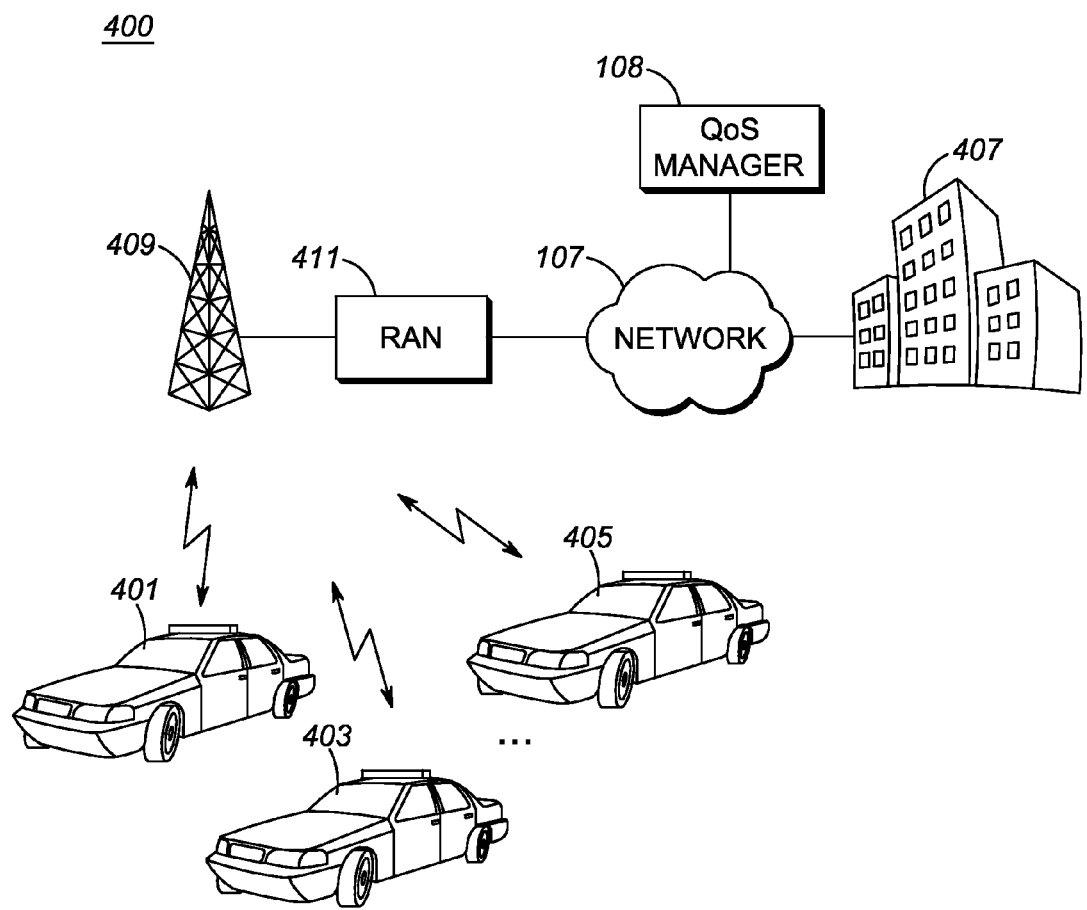
FIG. 4 illustrates employment of dynamic QoS control in accordance with a first embodiment of the present invention.

FIG. 4 illustrates employment of dynamic QoS control in accordance with a first embodiment of the present invention. In this scenario multiple public-safety vehicles 401-405 are receiving a downlink video feed from building 407. The downlink video feed is provided by base station 409 receiving the feed through radio access network (RAN) 411, which in turn receives the video feed from building 407 through network 107. Although QoS manager 108 is shown existing as a separate entity, in alternate embodiments of the present invention QoS manager 108 may be co-located with any network entity. For example, QoS manager 108 may reside in network core 107 or RAN 411 and utilized to control QoS for all links to/from base station 409.

During operation QoS manager 108 is in communication with network 107, RAN 411 and devices 401-403. In a preferred embodiment, network 107 comprises an LTE core network. Video from building 407 is originally supplied to vehicles 401-405 at initial QoS levels, which may be similar for each vehicle. The video feed is received by a remote device (as shown in FIG. 2) existing within vehicles 401-405 and used to display the video. As discussed above, the officers who arrive on scene may leave their vehicles and no longer be actively using the in-car devices. Whether the absence is detected by the devices themselves, or by QoS manager 108, the response to the absence is that QoS manager 108 instructs RAN 411, directly or via network 107 to lower the QoS level (e.g., bitrate or resource type) for those devices where the officer is no longer present within the vehicle. This allows a potentially higher QoS to be utilized by those vehicles still having officers present. Both uplink (device to base station) and downlink (base station to device) QoS may be modified accordingly. Thus, as described, the QoS manager may communicate any QoS change (via network control messages) to the network 107 which propagates the requested changes to the RAN and the device.

It should be noted that while the above scenario was described as having all vehicles co-located, this doesn't necessarily have to be the case. For example, vehicle 405 may be located far from vehicles 401 and 403, and in communication with a completely different RAN and base station. In this situation, vehicle 405 may still have its QoS increased or decreased as discussed above.

Figure 5:
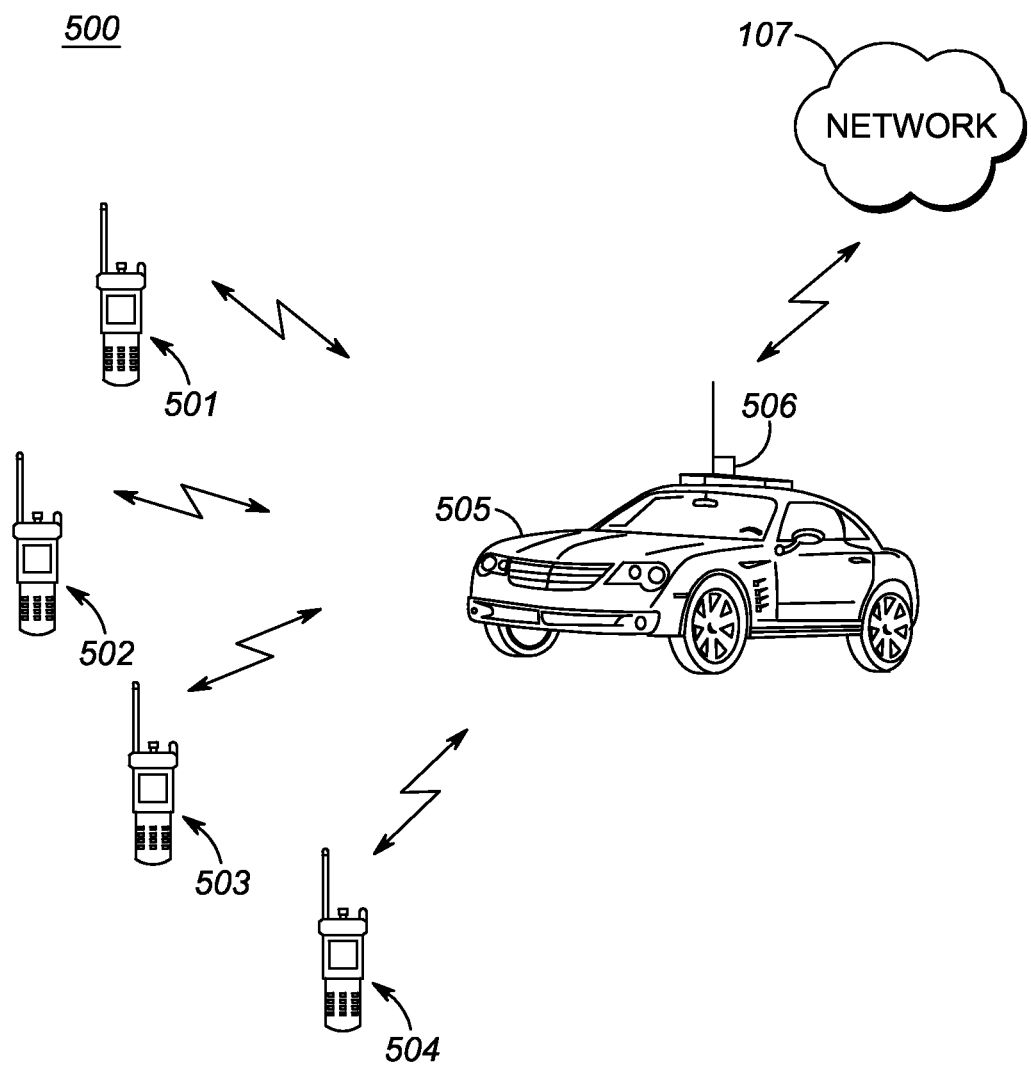
FIG. 5 illustrates employment of dynamic QoS control in accordance with a second embodiment of the present invention.

FIG. 5 illustrates employment of dynamic QoS control in accordance with a second embodiment of the present invention. In this scenario multiple public-safety radios 501-504 are using a same access point 506 located within vehicle 505. Although not shown in FIG. 5, access point 506 serves as QoS manager, having the functionality described above with reference to FIG. 3. All devices 501-504 are running multiple applications at various QoS levels. Access point 506 (serving as QoS manager 108) will determine (or be provided with an indication of) whether or not each device is currently being used by a user and/or whether or not particular applications running on devices 501-504 are being used. Those devices/applications that are not being used by a user will then have their QoS levels decreased. For example, if devices 501-504 are currently on an officer's belt, the device may be considered as not currently being used by the officer. Those devices that are currently being used may have their QoS values increased. It should be noted that after a QoS change, all applications continue to run on devices 501-504, however, they continue to run with modified QoS values. In other words, no application is terminated when unused.

Figure 6:
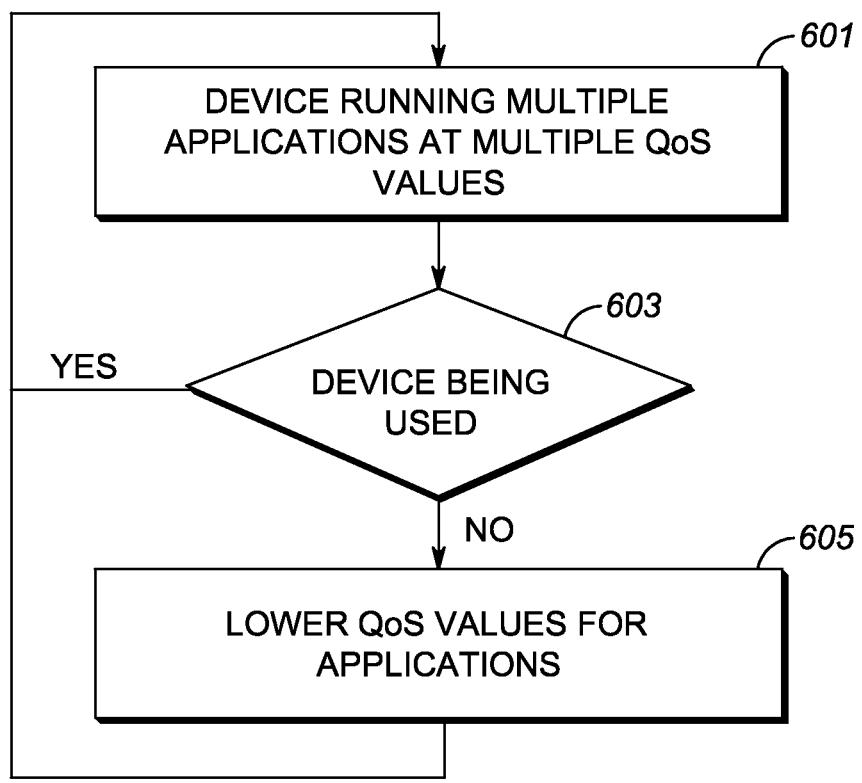
FIG. 6 illustrates employment of device and application activity factors of a QoS Manager of FIG. 1 for determining QoS for devices and/or applications.

FIG. 6 is a flow chart showing operation of the remote device of FIG. 2. In particular, FIG. 6 illustrates those steps taken by device 101 when adjusting the QoS of device 101 when the device as a whole is not being used. The logic flow begins at step 601 where a device, e.g., device 101 is running a first application using a first QoS by a first user. As discussed above, the QoS may comprise any quality of service parameter, however, in a preferred embodiment of the present invention the first QoS comprises a quality of an uplink and/or downlink wireless communication signal. Additionally, while step 601 describes device 100 running a first application, as discussed above, device 101 may be running multiple applications in addition to the first application.

At step 603 microprocessor 203 accesses context aware circuitry to determine if the device is being used by determining if there exists a direct interaction or contact between a user and the first device. As discussed above, this may comprise determining if a user is present via facial recognition circuitry detecting the presence of a face, may comprise determining that the user is using the device because a screen lock on the device is not activated, or may comprise determining that the user is using the device if there is an input on the device from the user over a predetermined period of time, determining if the user has left the vehicle where the device is installed.

If, at step 603 it is determined that the device is being used, the QoS remains unchanged with the logic flow returning to step 601. However if it is determined that the user is not using the device, the QoS of the applications may be lowered accordingly at step 605 and the logic flow returns to step 601 utilizing the new QoS values for the applications. Thus, the QoS of the device is adjusted based on whether or not the device is being used. This may comprise the steps of using transmitter 201 to convey the use status to QoS manager 108 via over-the-air messaging. In response, RAN equipment may be instructed by the device 101 to lower the QoS of any resources allocated to device 101 from a first QoS level to a second QoS level.

It should be noted that the all applications running on the device will continue to run, some with an adjusted QoS. Additionally, the step of adjusting the QoS comprises the step of lowering the QoS of the device when the device is not being used, otherwise either increasing the QoS to the device or maintaining the first QoS of the device.

As discussed above, the step of using a particular QoS may comprise the step of using a first bandwidth for uplink and/or downlink transmissions and adjusting the QoS may comprise adjusting the bandwidth used for uplink and/or downlink transmissions.

The step of determining that the first device is being used may comprise determining if the first device is inactive, if a face has been detected, if motion has been detected, or if the first device is co-located with a second device.

Figure 7:
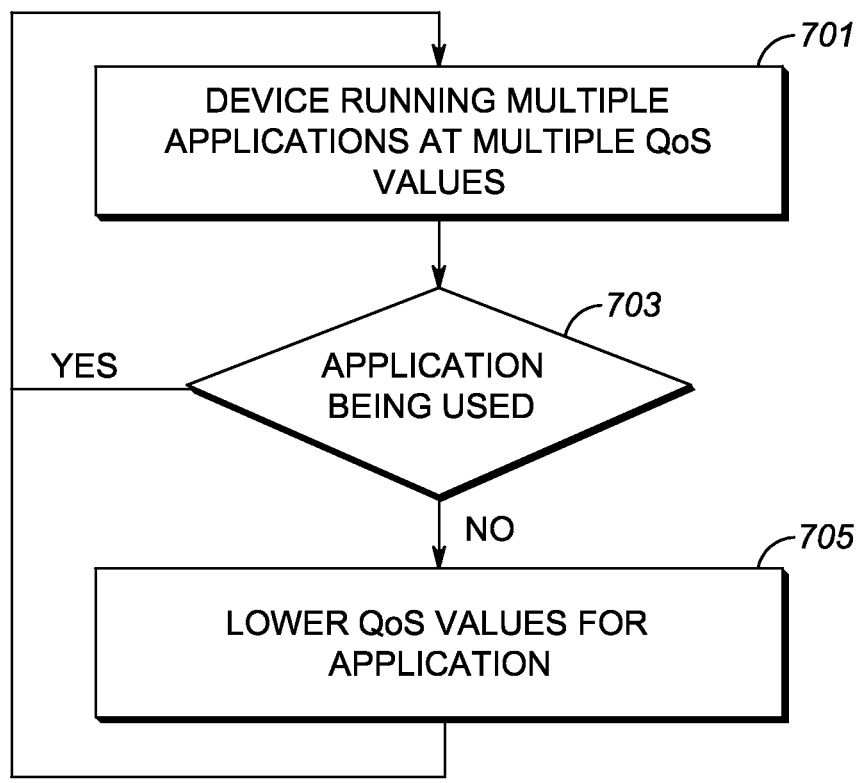
FIG. 7 is a flow chart showing operation of the remote device of FIG. 2.

FIG. 7 is a flow chart showing operation of the remote device of FIG. 2. In particular, the logic flow of FIG. 7 shows those steps taken by device 101 when adjusting the QoS of device 101 on an application-by-application basis when an application is being unused. The logic flow of FIG. 7 may be executed for each application being run on device 101.

The logic flow begins at step 701 where a device, e.g., device 101 is running multiple applications at multiple QoS levels. For example, a first application may be running at a first QoS level, and a second application may be running at a second QoS level. As discussed above, the QoS may comprise any quality of service parameter, however, in a preferred embodiment of the present invention the QoS comprises a quality of an uplink and/or downlink wireless communication signal.

At step 703 microprocessor 203 determines if a first application is being used. As discussed above, simply because an application is running on a device does not necessarily mean that it is being used. For example microprocessor 203 may determine that the application is running in the background, or the application is running in a window that exists behind another window or the application has been minimized. If any of these are determined, it is assumed that the application is not being used.

If, at step 703 it is determined that the first application is being used, the QoS is not lowered and the logic flow returns to step 701. However if it is determined that the user is not using the first application, then the QoS of the first application may be lowered accordingly at step 705. This may comprise the steps of microprocessor 203 instructing transmitter 201 and receiver 202 to adjust the QoS accordingly. Alternatively, this may comprise the steps of using transmitter 201 to convey the application use status to QoS manager 108 via over-the-air messaging. In response, QoS manager 108 may instruct network and RAN equipment to lower the QoS of the specified application flow to device 101 from a first QoS level to a second QoS level.

Figure 8:
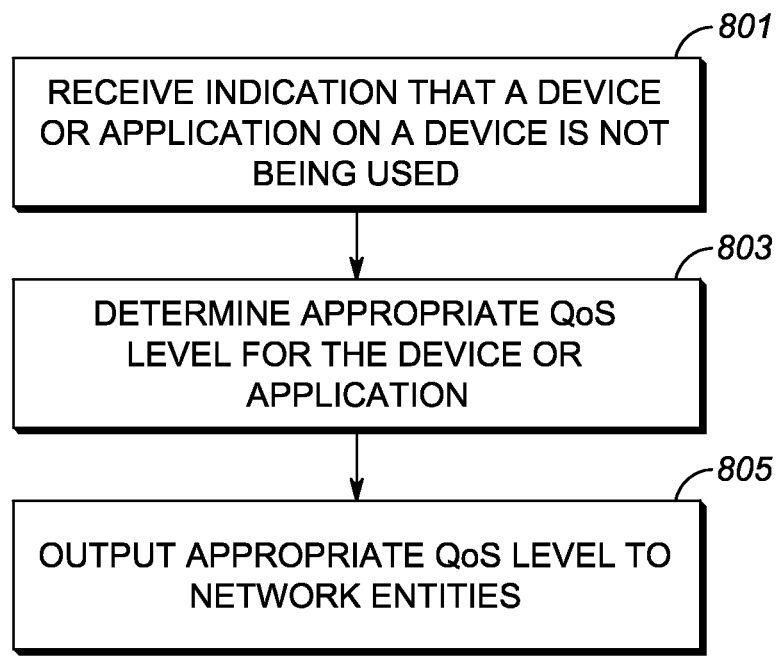
FIG. 8 is a flow chart showing operation of the QoS manager of FIG. 3.

FIG. 8 is a flow chart showing operation a network QoS manager of FIG. 3. The logic flow begins at step 801 where communication module 301 receives an indication that a device or an application running on a device is not being used by a user. Along with this indication, a device ID and application ID may be provided. Microprocessor 303 then accesses database 305 to determine an appropriate QoS level for the device or application (step 803). Finally at step 805 an appropriate QoS is output to entities existing within network 107. For example, a RAN controller may be provided the QoS adjustment for device 101, or device 101 may be instructed by microprocessor 303 to lower its QoS. Regardless of the process that is taken to lower QoS, when it is determined that an application, or alternatively the device is not being used by a user, the QoS of the device or application is lowered accordingly. The logic flow may continue to optional step 807 where QoS values for other network devices may be increased.

The above-described techniques for adjusting QoS levels for devices may be limited to situations where all devices are under the control of a single individual. When this is the case, it is much easier to determine whether or not a device is inactive, since the activity of any device under the control of a single individual may indicate inactivity of the other devices under the control of the single individual. For example, assume that it is ambiguous whether or not three devices are being used. In this case, their QoS may not be adjusted. However, if User 1 is using a first device by actively typing on a keyboard, the other two devices may be assumed to be unused if they are under the control of User 1. In other words, User 1's use of the first device may cause other devices under his control to be identified as being unused. As is evident, if the other devices were not under the control of User 1, their use may still remain ambiguous.

With the above in mind, database 305 may be populated with a table that identifies devices under the control of various individuals. Such a table is shown below:

TABLE 1

Devices Identified Under the Control of a Single Individual

| USER | MAC Address of devices under user's control |
|---|---|
| Fred Smith | 02341837563858, 000136783245386, 141837563829, 428637563859 |
| John Doe | 385938576839 |
| ... | ... |
| Jane Doe | 194860385860, 970493728495 |

The data used to populate table 1 may be input by hand into QoS manager 108 and dynamically change as, for example, shifts change, devices become obsolete, new devices are acquired, . . . , etc. Thus, during operation, a device may be identified as "unused" if another device controlled by a same individual is identified as being "used". Thus, for example, with reference to FIG. 1, assume the use of devices 101-103 is ambiguous. In other words, QoS manager 108 has not determined if the devices are used, or unused. If device 101 is then identified as being used, then those devices that have the same user associated with them will be automatically identified as unused. Thus, when device 101 is determined to be actively used, the use of device 102 may still remain ambiguous if it is not under the control of the same user as device 101. However, if device 101 and device 102 share the same user, the active use of device 101 will automatically result in the status of device 102 being changed to "unused", and QoS management for devices 101 and 102 may take place as described above.

Figure 9:
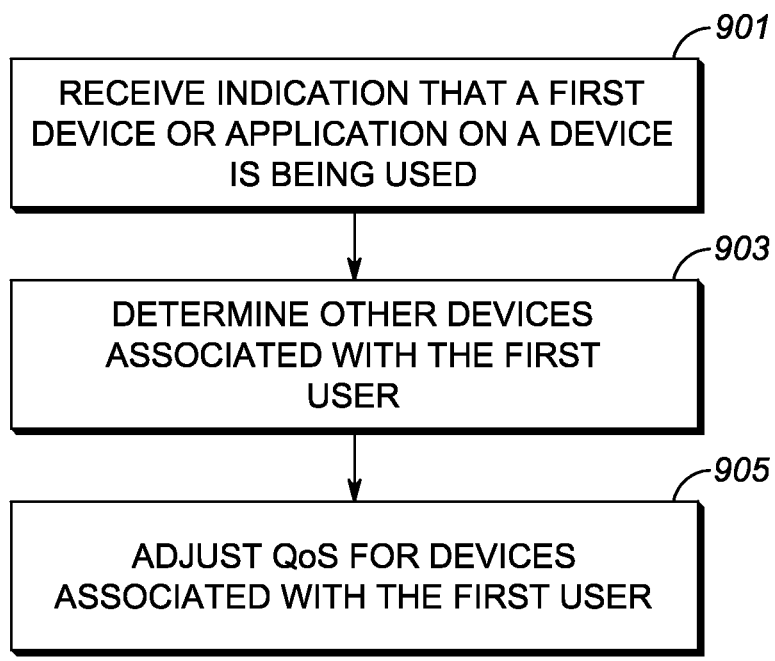
FIG. 9 is a flow chart showing operation of the QoS manager of FIG. 3.

FIG. 9 is a flow chart showing operation a network QoS manager of FIG. 3. The logic flow begins at step 901 where communication module 301 receives an indication that a device or an application running on a first device is being used by a first user. The logic flow then continues to step 903 where microprocessor 303 accesses database 305 and determines those devices associated with the first user. At step 905 only those devices associated with the first user will have their QoS adjusted as described above. In other words, the first device may have its QoS increased, while all other devices will be identified as being unused, and may have their QoS decreased. Those devices not associated with the first user will have their QoS remain unchanged.

The QoS for all devices may be adjusted as indicated in FIG. 6 through FIG. 8. With this in mind, the flow charts shown in FIG. 6 through FIG. 8 may have the added steps of logic circuitry determining other devices under the control of the first user, and identifying the other devices as being unused. Use of the first device then causes the status of the other devices to be changed to unused and their QoS lowered accordingly.

QoS manager 108 may take into consideration the application or application flow being used on each device of the single user when determining QoS adjustments. If the same application or application flow is being requested on a second device of the same user, then the QoS is lowered on the first device (i.e. when requesting same video feed on device 2, then lower the video feed QoS to device 1). However, if the application being requested on the second device is different than the application (or application flow) on the first device, the application(s), or application flow(s) are taken into consideration when adjusting the QoS of the device or application flow. No QoS adjustment may occur when the applications being utilized on the different devices of the same user when the application used on each device differs.

For example, there may be the case that an officer is watching a video on a mobile (device 1), and wants to talk to his captain on the phone regarding the video being watched. The act of starting a voice call on device 2 should not result in the lowering of the video QoS on device 1. Another example is where an officer uses device 2 to send text a message while watching the video. Text messages are generally sent over default bearers (i.e. no/lowest QoS). The act of sending a text message on device 2 should not result in the lowering of my video QoS on device 1.

With the above in mind, the logic flows of FIG. 6 through FIG. 8 may have the added steps of having logic circuitry determine applications being used on the first device and the other devices under the control of the same user, and adjusting the QoS only for the other devices when the application being used on the other devices is the same as the application being used for the first device. Devices not under the control of the first user have their QoS remain unchanged.

In the foregoing specification, specific embodiments have been described. However, one of ordinary skill in the art appreciates that various modifications and changes can be made without departing from the scope of the invention as set forth in the claims below. For example, while the primary implementation of the present invention was described in reference to a public-safety network, the above-described techniques to control QoS may equally apply to a home network or enterprise network. Many homes have multiple computers, smart phones, entertainment systems that all share a common local broadband network. Detecting applications and or devices that are "not being used" can be applied in those situations as described above.

Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for controlling a Quality of Service (QoS) to a first device, the method comprising the steps of:
    running a first application using a first QoS on the first device by a first user;
    determining if the first device is being used by determining if there exists a direct interaction or contact between the user and the first device;
    adjusting the QoS of the first device based on whether or not the first device is being used;
    continuing to run the first application with the adjusted QoS on the first device;
    determining other devices under the control of the first user;
    identifying the other devices as being unused, wherein use of the first device causes the status of the other devices to be changed to unused; and
    adjusting the QoS for the other devices.

2. The method of claim 1 wherein the step of adjusting the QoS of the first device comprises the step of lowering the QoS of the first device when the first device is not being used, otherwise performing the steps of either increasing the QoS to the first device or maintaining the first QoS of the first device.

3. The method of claim 1 wherein the step of using a first QoS comprises the step of using a first bandwidth for uplink and/or downlink transmissions and wherein the step of adjusting the QoS comprises the step of adjusting the bandwidth used for uplink and/or downlink transmissions.

4. The method of claim 1 wherein the step of determining that the first device is being used comprises the step of determining if the first device is inactive.

5. The method of claim 1 wherein the step of determining that the first device is being used comprises the step of determining if a face has been detected.

6. The method of claim 1 wherein the step of determining that the first device is being used comprises the step of determining if motion has been detected.

7. The method of claim 1 wherein the step of determining that the first device is being used comprises the step of determining if the first device is co-located with a second device.

8. The method of claim 1 further comprising the step of:
determining applications being used on the first device and the other devices; and
wherein the step of adjusting the QoS for the other devices comprises the step of adjusting the QoS only for the other devices when the application being used on the other devices is the same as the application being used for the first device.

9. A method comprising the steps of:
receiving an indication that a first device is being used by a first user, wherein the determination was made by determining if there exists a direct interaction or contact between the first user and the first device;
adjusting the QoS of the first device based on whether or not the first device is being used by the first user;
determining other devices under the control of the first user;
identifying the other devices as being unused, wherein use of the first device causes the status of the other devices to be changed to unused; and
adjusting the QoS for the other devices;
wherein the step of adjusting the QoS comprises the step of sending a network control message to network entities.

10. The method of claim 9 wherein devices not under the control of the first user have their QoS remain unchanged.

11. The method of claim 9 further comprising the step of:
determining an application being used on the first device and the other devices; and
wherein the step of adjusting the QoS for the other devices comprises the step of adjusting the QoS only for the other devices when the application being used on the other devices is the same as the application being used for the first device.

12. An apparatus comprising:
logic circuitry determining if a first user using a first device is running a first application using a first QoS;
the logic circuitry determining if the first device is being used by determining if there exists a direct interaction or contact between a first user and the first device;
the logic circuitry adjusting the QoS of the first device based on whether or not the first device is being used;
the logic circuitry continuing to run the first application with the adjusted QoS on the first device;
the logic circuitry determining other devices under the control of the first user;
the logic circuitry identifying the other devices as being unused, wherein use of the first device causes the status of the other devices to be changed to unused; and
the logic circuitry adjusting the QoS for the other devices.

13. The apparatus of claim 12 wherein the logic circuitry adjusts the QoS of the first device by lowering the QoS of the first device when the first device is not being used, otherwise the logic circuitry either increases the QoS to the first device or maintains the first QoS of the first device.

14. The apparatus of claim 12 wherein:
the logic circuitry determines an application being used on the first device and the other devices; and
wherein the logic circuitry adjusts the QoS for the other devices only when the application being used on the other devices is the same as the application being used for the first device.

* * * * *

UNITED STATES PATENT AND TRADEMARK OFFICE
CERTIFICATE OF CORRECTION

PATENT NO. : 9,071,986 B2
APPLICATION NO. : 13/856711
DATED : June 30, 2015
INVENTOR(S) : Alejandro G. Blanco et al.

Page 1 of 1

It is certified that error appears in the above-identified patent and that said Letters Patent is hereby corrected as shown below:

IN THE DRAWINGS:

In FIG. 2, Sheet 2 of 8, for Tag "205," in Line 3, delete "CIRUITRY" and insert -- CIRCUITRY --, therefor.

In FIG. 3, Sheet 2 of 8, delete "DEVICEID," and insert -- DEVICE ID, --, therefor.

IN THE SPECIFICATION:

In Column 1, Line 53, delete "is" and insert -- is a --, therefor.

In Column 1, Line 64, delete "1for" and insert -- 1 for --, therefor.

In Column 4, Line 2, delete "is" and insert -- is a --, therefor.

In Column 5, Line 12, delete "circuitry 105" and insert -- circuitry 205 --, therefor.

In Column 6, Line 3, delete "my" and insert -- may --, therefor.

In Column 6, Line 33, delete "3. (wherein" and insert -- 3 wherein --, therefor.

In Column 6, Line 38, delete "combination)" and insert -- combination). --, therefor.

In Column 11, Line 3, delete "and or" and insert -- and/or --, therefor.

Signed and Sealed this
Twelfth Day of July, 2016

Michelle K. Lee
*Director of the United States Patent and Trademark Office*